No. 714,098. Patented Nov. 18, 1902.
J. D. CALDWELL.
SHINGLE EDGING MACHINE.
(Application filed Jan. 6, 1902.)
(No Model.) 2 Sheets—Sheet 1.
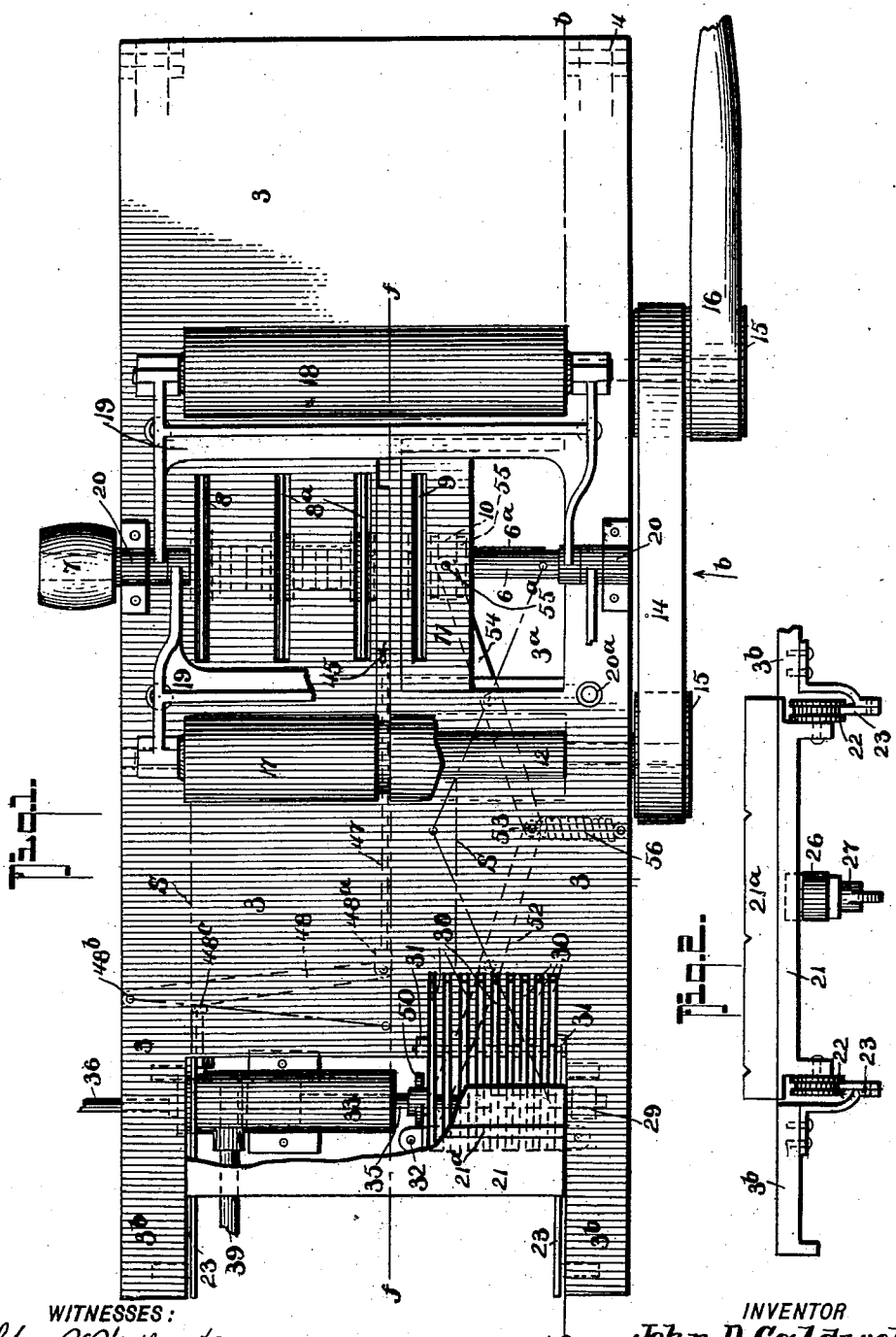
WITNESSES:
Guy V. Worthington
Louis Dietrich
INVENTOR
John D. Caldwell
BY
Fred G. Dietrich & Co.
ATTORNEYS

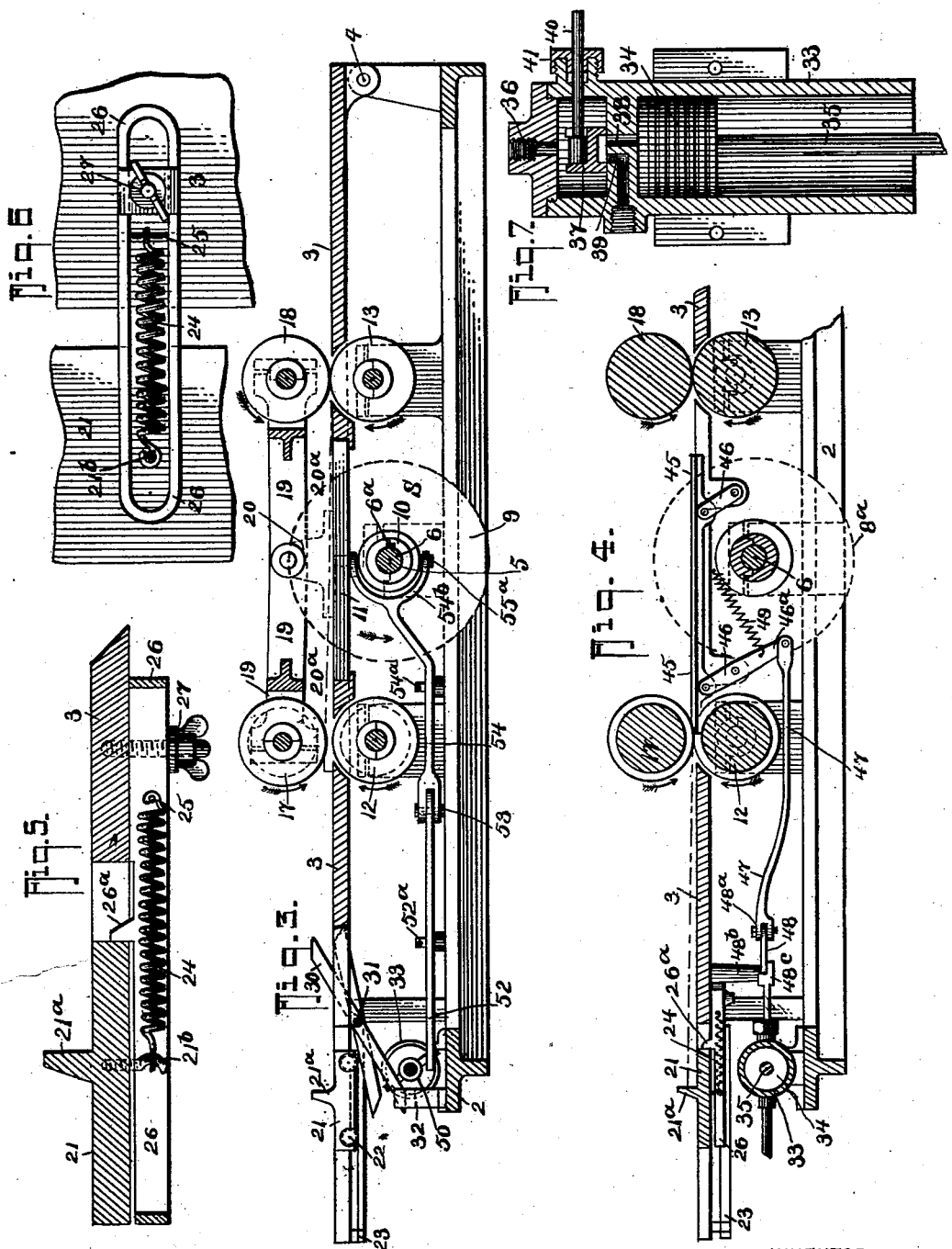

UNITED STATES PATENT OFFICE.

JOHN DAVID CALDWELL, OF VANCOUVER, CANADA.

SHINGLE-EDGING MACHINE.

SPECIFICATION forming part of Letters Patent No. 714,098, dated November 18, 1902.

Application filed January 6, 1902. Serial No. 88,519. (No model.)

*To all whom it may concern:*

Be it known that I, JOHN DAVID CALDWELL, a citizen of the Dominion of Canada, residing at Vancouver, in the Province of British Columbia, Canada, have invented a new and useful Shingle-Edging Machine, of which the following is a specification.

My invention relates to a machine for trimming the outer side edges of shingles and for cutting them to gage, and in designed so that one of the edging-saws shall be automatically adjusted on the spindle, so as to trim just within the constantly-varying and irregular widths of the rough shingles. The automatic width adjustment of the edging-saw is an essential feature of my machine and may be applied without the use of uniform width-gaging saws in order to trim the edges and retain as full a width as possible in the production of what are known in the trade as "random shingles."

My drawings herewith fully illustrate the machine for cutting shingles to gage and trimming the edge of the overplus, and to use it for edging random shingles necessitates merely the omission or removal of the saws between the extreme ones and possibly a larger range to the slidable saw.

Figure 1 is a general plan of the machine with portions of the top roller removed; Fig. 2, an end elevation of the feeding-carriage. Fig. 3 is a vertical longitudinal section and elevation proximate to the line *b b* in Fig. 1 looking in the direction of the arrow *b*. Fig. 4 is a sectional elevation on the line *f f* looking as in the previous view. Figs. 5 and 6 are details of the spring connection of the feed-carriage, and Fig. 7 a detail of the steam-cylinder for actuating the movable edging-saw and its connections therewith.

In the drawings, 2 represents the main frame of the machine, carrying the saws and driving mechanism and supporting above it the table 3 at a suitable height from the floor-line. This table is hinged to the frame at 4, so that it can be raised for examination and attention to the mechanism below it.

Rotatable in bearings 5 on each side of the frame 2 is the saw-spindle 6, driven by means of the pulley 7, and on this spindle within the side frames toward one end are secured the saws 8 and $8^a$, spaced apart by washers, so that the desired gage width of the shingles may be obtained. Toward the other end of the spindle 6 is the saw 9, fixed on the arbor 10 so as to be slidable on the spindle, but rotatable with it, by means of the feather-key $6^a$. The table 3 is provided with openings, through which the saws 8 and $8^a$ project; but as the saw 9 is movable on its spindle it is provided with a separate table-piece 11, laterally slidable within the space $3^a$ provided and having its upper surface flush with that of the table 3. Through this piece 11 the saw 9 projects, and the slidable piece is also provided below with a suitable engagement to the slidable saw-arbor 10, so that they may move laterally together.

Rising just above the upper surface of the table 3 through suitable openings provided just in advance of and behind the saws are the feed-rollers 12 and 13. These rollers are rotatable in bearings on the side frames of 2 and are driven at the desired speed by the belts 14 and 16, passing over the pulleys 15.

Immediately over each roller 12 and 13 are the rollers 17 and 18, rotatable in bearings in the swinging frames 19, pivotally supported on a bracket 20, attached on each side to the table 3. These rollers are for holding the shingles down on the table and in frictional contact with the feed-rollers during the passage of the shingles between the saws and are mounted in a pivoted frame, so as to maintain their parallelism while they lift over the taper of the shingle. They are also provided with a spring-cushion to check their fall.

At the extreme forward or entering end of the machine is the feed-carriage 21, (see Figs. 2, 5, and 6 for details,) having an upwardly-projecting bar $21^a$ across it. This carriage is provided with the small grooved wheels 22, which run on the edge tracks 23, supported from the under side of extensions $3^b$ of the table, so that the upper surface of the carriage is flush with that of the table. This carriage 21 is drawn in toward the feed-roller by a spring 24, one end of which is connected to a downwardly-projecting pin $21^b$ from the carriage 21 and the other to a pin 25 in an inclosing frame 26, adjustably attached to the under side of the table 3 by the screw and butterfly-nut 27 to facilitate adjustment. On the upper side of 26 is a stop 26ª to limit the forward movement of the carriage. The stop-distance of the bar 21ª may thus be changed to suit a different length of shingle without altering the tension of the spring or the range of its movement, as the stop and the spring connection are changed simultaneously.

In feeding the shingles to the machine the butt or thick end is placed against the bar 21ª, with its left-hand edge a trimming amount beyond the line of the fixed saw, (see dot-and-dash line S in Fig. 1,) which the width of the shingle requires, (the position of each saw being indicated on the bar by a notch, as shown in Fig. 2.) The carriage is then drawn back toward the operator. The flat of the shingle is laid on the table and on being released is carried by the spring 24 so that its thin edge is taken hold of by the feed-rollers and carried through the saw. By this means it is insured that the edges are trimmed square to the butt.

I will now describe the means by which the edging-saw 9 is moved on the spindle 6 so as to trim the edges of a shingle to a width just within the rough dimensions of the same as fed to the machine. To the right of the entering end of the table 3 is a series of short levers 30, independently pivoted on a pin 31, secured to lugs on the under side of the table. These levers are so pivoted that the forward ends of them by the slightly-preponderating afterweight project above the surface of the table, and the lower ends when in this position are supported in a notched bar 32, secured to the cross member of the frame 2. The levers 30 are closely arranged side by side within the desired range of variation in width of shingle. Fixed to the cross member of the frame 2 of the machine below the carriage 21 and to the left-hand side is a fluid-pressure cylinder 33, (see Fig. 7 for detail,) the axis of which is below the lower ends of the pivoted levers 30, and within this cylinder is the piston 34, having a piston-rod 35, extending across the width of the machine and supported at the outer end in the guide 29. Steam or other suitable fluid is conveyed to the steam-chest of the cylinder 33 by the pipe 36, and its admission to the piston end and exhaust therefrom is controlled by the slide-valve 37 over the steam and exhaust ports 38 and 39. This valve is moved by the stem 40, passing through the gland 41.

The valve controlling the movement of the piston is operated by the following mechanism: In the table 3 between the rollers 12 and 13 and parallel with the face of the saw is a narrow elongated opening or deep recess, in which a bar 45 is adapted to move, being pivotally supported from below the table on parallel links 46. This bar in its normal position stands far enough above the top surface of the table 3 that its end will engage the front edge of a shingle approaching through the rollers. As the striking end of the bar in its normal position is about the contact of the rollers 12 and 17, these rollers are grooved, as shown, to clear the end of it. One of the parallel links 46 has its lower end prolonged and has attached to it at 46ª the connecting-rod 47, extending toward the entering end of the machine, where it is connected at 48ª to a lever 48, fulcrumed at 48ᵇ to the under side of the table 3 and adapted to engage at 48ᶜ, between the fulcrum and the connecting-rod, the valve-stem 40. Thus as soon as a shingle passes through the forward feed-rollers 12 and 17 it engages the bar 45 and carrying it with it opens, by means of the lever system described, the steam-admission to the piston before the shingle enters between the saws, and as the shingle while passing through the saws keeps the bar 45 down the steam-valve is retained in that position until the shingle has passed through, when the mechanism is returned to its normal position and the valve opened to the exhaust by a tension-spring 49, suitably connected between the extension of the link 46 and the under side of the table 3.

Attached to the piston-rod 35 in such a position as to be clear of the lower end of the short levers 30 when the piston is at the extreme back end of its stroke is the cross-head 50, one end of which is adapted to engage the side of the short levers 30, while the opposite end engages the end of a lever 52, which, fulcrumed at 52ª to the frame 2 of the machine, has its other end suitably connected at 53 to a similarly-proportioned lever 54, fulcrumed at 54ª also to the frame 2. This lever 54 has a forked end 54ᵇ, adapted to receive the opposite studs 55ª of a loose ring 55 in a circumferential groove of the arbor 10 of the slidable saw 9. The combined action of this mechanism is as follows: The operator places the butt of a shingle on the bar 21ª of the carriage 21 in the position the width requires, draws back the carriage, allows the flat of the shingle to fall on the table, and releases his hold. The spring on the carriage carries it within reach of the feed-rollers and simultaneously such of the short levers 30 as are covered by the width of the shingle are depressed and their lower ends thus disengaged from the notched bar 32 and clear of the path of cross-head end. The shingle, meanwhile drawn in with the feed-rollers, engages the bar 45 and through its attached mechanism the port is opened, by which steam is admitted to the piston. The piston is forced out and one projection of the cross-head 50 engages the end of the lever 52 and carries it with it until further movement of the piston is checked by the opposite end of the cross-head engaging the first lever 30, which has not had its upper end depressed by the shingle, and therefore retains its position in the notched bar 32 and in the path of the piston cross-head end. The movement of the lever 52 effects, through the lever system described, the sliding of the saw 9 and its independent table-piece 11 to the position required to trim the shingle entering.

The second feed-roller and its superposed lifting-roller take hold of the cut shingles and carry them through the machine. As soon as a shingle clears the bar 45 it is returned to its normal position and the valve 37 opens the cylinder to the exhaust, when the levers 52 and 54 and the piston 34 are carried to their normal positions by the spring 56 between the lever connection 53 and the frame 2.

Having now particularly described my invention, what I claim is—

1. In a machine for the purpose specified, having on a suitable table, one or more circular saws fixed to their spindles, and means for feeding shingles thereto; a further circular saw rotatable with, but slidable axially on the same spindle as the fixed ones; a fluid-pressure cylinder having a piston, and mechanism connecting the same and said saw; a series of short levers pivotally secured to the table and coöperating with the width of the shingle acted upon, and also with the piston to limit the movement thereof, whereby the slidable saw may be automatically moved laterally to a width approximate to, but within that of the shingles to be edged.

2. In a shingle-edging machine, having a table along which the shingles pass, and a rotatable saw-spindle across it, having one or more circular saws fixed thereto; a similar circular saw slidably mounted on the same spindle so as to be rotatable with it, and a mechanism, operated by fluid-pressure, whereby the position of the slidable saw in its lateral relation to the fixed ones, may be regulated by the width of the shingle approaching the saws.

3. In a machine for trimming the edges of shingles, having circular saws, one or more fixed and one axially slidable, rotating together; a fluid-pressure cylinder, having a piston suitably connected to a loose ring on the hub of the slidable saw, whereby it may be moved laterally on its spindle; mechanism before the entrance to the saws, whereby an entering shingle may operate a valve, and fluid under pressure be admitted to the piston, and means whereby the outward travel of the piston may be regulated to the approximate width of the shingle to be trimmed.

4. In a machine for the purpose specified, having a table through which projects one or more circular saws, rotatable with a cross-spindle; a similar saw slidable axially on a feather on the same spindle; a section of the table adapted to receive and travel laterally with the slidable saw; means whereby shingles may be fed through the saws; and a mechanism operated by the piston of a fluid-pressure cylinder for moving the saw longitudinally on its spindle; a series of short levers, adapted to be depressed by the shingle about to be acted upon, a greater or less number of said levers being depressed according to the width of the shingle; said levers also coöperating with said saw-controlling piston to limit the movement thereof, whereby the position of the slidable saw may be adapted to the varying widths of the shingles before and during the cutting.

5. In a machine for trimming the edges of shingles by means of circular saws, and having rollers to feed the shingles to the saws and hold them down during cutting; a feed-carriage slidable toward the entering feed-roller; an upwardly-projecting bar across such carriage, parallel to the axes of the rollers and square to the plane of rotation to the saws, a spring attachment, whereby such carriage is drawn toward the feed-rollers; a frame inclosing the spring and attached to the under side of the machine; and means for the longitudinal adjustment of said frame upon said table, whereby the initial distance of the bar from such feed-rollers is varied.

6. In a machine for the purpose specified, the combination with a stout under frame, across which is a saw-spindle, rotatable in suitable bearings and having one or more circular saws secured thereto; of a further saw slidably mounted on the same spindle to rotate with it; feed-rollers rotatably mounted in bearings on the same frame, parallel to the axis of the saw-spindle, means by which such rollers may be driven at a suitable speed opposite in direction to the rotation of the saws; a table surmounting the frame, the upper surface of which is parallel to and slightly below the upper surface of the feed-rollers; a hinged connection to the under-frame at one end of such table; apertures in the table to permit the fixed saws and feed-rollers to project through; a rectangular opening in the table surrounding the slidable saw and its range of movement, a separate section or table slidable within such opening and movable laterally therein with the slidable saw, and having an opening through which such saw projects; superposed rollers parallel to the feed-rollers; frames, carrying such upper rollers, pivotally mounted on the table so as to maintain the parallelism while rising and falling; cushions to check the fall of the upper rollers on the lower; a feed-carriage at the entering end of the machine, mounted on rollers and tracks so as to be slidable toward the feed-rollers; a cross-bar on such carriage parallel to the axes of the feed-rollers, a spring to draw such carriage toward the feed-rollers; an adjustable attachment for such spring having a check or stop to limit the inward movement of the carriage, and mechanism whereby the slidable saw may be automatically moved to a position suitable to trim the edge of an entering shingle.

7. In combination with a shingle-trimming machine as described in the foregoing claim, a cylinder secured to the underframe beneath the table at the entering end of the machine, a piston slidable within such, having a piston-rod attached; a cross-head having outwardly-projecting ends secured to the piston-rod; a horizontal spring-controlled lever fulcrumed to the underframe and having one end disposed in the path of the piston cross-head; a similar lever fulcrumed also to the underframe, having one end connected to the foregoing lever and the other adapted to engage projecting studs on a loose ring on the slidable saw-hub; a series of short levers pivoted in the table to one side of the path of the shingles, the forward ends of which project above the level of the table while their lower ends are disposed in the path of the crosshead; a notched bar secured to the underframe and adapted to receive the lower ends of the levers when in the path of the crosshead; and means for operating a valve to admit a fluid under pressure to the piston as a shingle is about to enter between the saws and exhaust such when the shingle is cut.

8. In a shingle-edging machine of the class described, having a fluid-pressure piston for operating the slidable saw and a means for regulating the movement of such in accordance with the width of the shingle to be cut; an actuating mechanism, comprising a bar in a recess of the table projecting above the surface of such and extending longitudinally from the first feed-roller to behind the saw; short links pivotally supporting such bar to the under side of the table, a downward extension on one of these; a connecting-rod between the lower end of the extension and the end of a horizontal lever adjacent to the operating-cylinder, such lever being fulcrumed to the under side of the table and designed to bear against and operate the stem of the cylinder, whereby a fluid-pressure may be admitted to and exhausted from behind the piston; and a spring to return such mechanism to its normal position.

9. In a machine for the purposes described; a suitable frame, cutter mechanism mounted transversely thereof, said cutter mechanism including a laterally-slidable saw, a fluid-pressure cylinder having a piston-controlling mechanism for moving said saw laterally; a series of narrow levers coöperating with the width of the shingles to limit the movement of said piston, and means governed by the shingle as it enters toward the saws, adapted to operate the piston, whereby the slidable saw is automatically set to trim the rough edge of the shingle a distance proportionate to the width of said shingle.

10. In a machine as described, an edge-trimmer saw, shiftable to suit the variable widths of the shingle-stock before cutting, and means for automatically shifting the trimmer-saw to the required degrees, said means including a piston operated by fluid-pressure, and a series of trip devices limiting the movement of the same, and adapted to be engaged by the passing shingle operated on, for the purposes described.

11. In a machine as described, an edge-trimmer saw, shiftable before each cut to suit the variable widths of the shingle-stock; and means for automatically shifting the trimmer-saw to the required position, said means including a piston operated by fluid-pressure, and means controlling the piston operation, also engaged by the shingle, as set forth.

12. In a machine of the character described, the combination with the rotary cutters and the shingle-feed rolls coöperating therewith, for the purposes described; of a shingle-feed comprising a frame-piece adjustably extensible forward of the entrant or feed end of the machine, said frame having a stop, a carriage longitudinally movable on the main frame, in a plane above the extensible frame-piece, said carriage having a shingle-supporting surface in a plane with the bed of the main frame, and pusher-lug 21$^a$, the front edge of said carriage being adapted to engage with the stop on the extensible frame, and be limited in its forward movement thereby, a spring connection joining the carriage and the extensible frame, for drawing the carriage inward toward the cutters, as set forth.

13. In a machine of the character described, an edge-trimmer, consisting of a laterally-shiftable circular saw, lever mechanism connected therewith for shifting the said circular saw, a series of short levers, a greater or less number of which are tripped by each shingle about to be operated upon, according to the width of said shingle, for limiting the movement of said lever mechanism, and thereby automatically varying the thrusts of the same to suit the varying widths of the shingles being operated upon, as set forth.

14. In a machine as described, a laterally-shifted edge-trimmer saw, and a shingle-feed mechanism, in combination with mechanism for shifting the said saw proportionately to the width of the shingle being operated on, said mechanism including a fluid-pressure-operated piston, and a series of stops for limiting the outward thrust of the piston, said stops being supported to be engaged by the shingle being trimmed, and shifted out of an operative position, substantially as shown and for the purposes described.

15. In a machine as described, the combination with the saws 8 8, and the feed-rolls 12, 17, 13, 18, the laterally-shiftable edge-trimmer saw 9, and the fluid-operated piston 35, the valve devices for the cylinder 33, including the slide-rod 40; of the swingable frame 45, held in the path of the passing shingle and adapted to be elevated by contact with the shingle, and the lever devices 46 47 and 48, connecting said frame 45 and the rod 40, all being arranged substantially as shown and for the purposes described.

JOHN DAVID CALDWELL.

In presence of—
ROWLAND BRITTAIN,
ELLICE WEBBER.